United States Patent [19]

Golias

[11] Patent Number: 4,505,557
[45] Date of Patent: Mar. 19, 1985

[54] MICROSCOPE SLIDE
[75] Inventor: Tipton L. Golias, Beaumont, Tex.
[73] Assignee: Helena Laboratories, Inc., Beaumont, Tex.
[21] Appl. No.: 408,247
[22] Filed: Aug. 16, 1982
[51] Int. Cl.³ .................................... G02B 21/34
[52] U.S. Cl. ................................................. 350/536
[58] Field of Search ............... 350/534, 535, 536; 356/244

[56] References Cited

U.S. PATENT DOCUMENTS 2,039,219  4/1936  Hausser et al. ............... 350/536
3,481,659  12/1969  Rosenberg ..................... 350/535
3,777,283  12/1973  Elkins .......................... 350/536
3,961,346  6/1976  White ........................ 350/536 X Primary Examiner—John K. Corbin
Assistant Examiner—Lynn Vandenburgh Kent
Attorney, Agent, or Firm—Phillips, Moore, Lempio & Finley

[57] ABSTRACT

A microscope slide has a plurality of specimen chambers formed by a plurality of upstanding transverse separators and a cover portion. The cover portion is separated from the base portion by an amount sufficient to result in capillary action drawing a fluid such as urine into the chamber when it is applied to the base portion.

10 Claims, 5 Drawing Figures

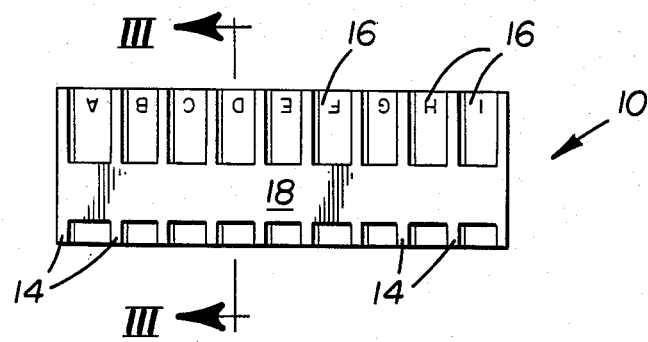
FIGURE 1
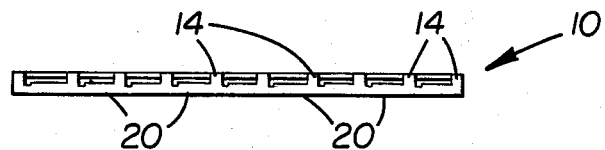
FIGURE 2
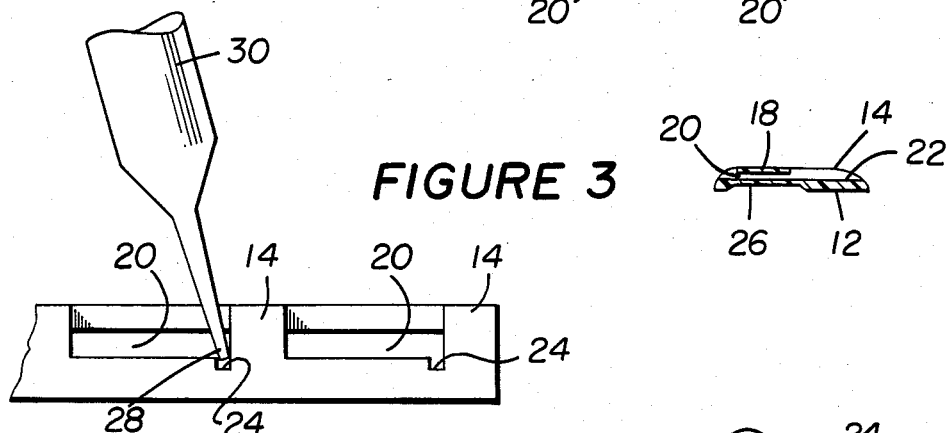
FIGURE 3
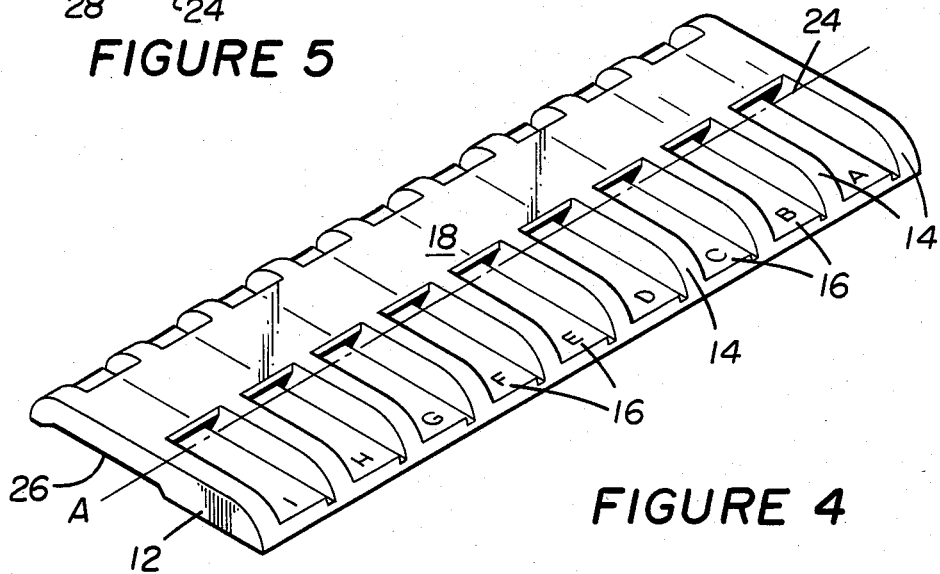
FIGURE 5
FIGURE 4

1

MICROSCOPE SLIDE

TECHNICAL FIELD

This application relates to microscope slides. In particular it relates to microscope slides that are especially adapted for observation of fluid specimens such as urine or other fluids associated with the human body.

BACKGROUND ART

The examination of biological specimens such as blood or urine is quite common in the medical profession. The procedure usually consists of placing a small quantity of the specimen on a microscope slide and spreading the quantity over the microscope slide in a thin layer. This may be accomplished by a cover glass or the like. In quantitive procedures the thickness of the layer may be important so that a true measure of the quantity observed is obtained.

In recent years slides have been made with an integrally formed "cover glass", most recently represented by U.S. Pat. No. 3,777,283, granted Dec. 4, 1973, to Carlos D. Elkins. The Elkins' slide includes a plurality of specimen containers each opened to one elongated side of the slide. The compartment is formed in a half moon shape having a top portion separated from the lower portion by an amount sufficient to permit capillary action to draw the sample into the chamber. While this slide performs the task adequately, it can present problems when the various cavities are overfilled. The cavities are totally dependent on capillary action to fill and, while this is usually accomplished easily there is a probability that an underfill could occur in which case there would be no means for accomplished easily there is a probability that an underfill thin half-moon shaped container, the mold must include rather delicate metal finger-like cores that do not have support at the extreme end. This can result in varying thickness in the "cover glass" portion of the molded slide.

Other versions of microscope slides which have been adapted for use in sample testing usually include more than a single piece. That is, a cover glass is also required so that the technician must first place the sample on the slide itself, and then place a cover glass over the sample in order to complete the microscopic examination.

In some cases the slide is built with the cavity for containing the specimen and an access hole either on the face of the slide or on one end of the slide. This access hole is used for placing the specimen on the test slide at the appropriate point. Capillary action may also be used in these applications to facilitate the material being drawn into the inspection area.

It is an object of this invention to provide an improved microscope slide for specimen observation that overcomes disadvantages of previous slides.

It is a further object of this invention to provide a reasonably low priced microscope slide that is capable of being used with a plurality of samples.

DISCLOSURE OF THE INVENTION

The present invention is directed to overcoming one or more of the problems set forth above. In one aspect of this invention, an improved microscope slide has a plurality of specimen chambers. The slide is formed of an elongated base portion having a plurality of upstanding transverse separators integrally formed with the base portion. The cover portion, also integrally formed with the base portion, interconnects the transverse separators and forms with the separators and the base portion the plurality of specimen chambers.

This improved microscope slide provides a plurality of specimen chambers. Its construction is simplified and the quality improved because the tongue shaped cores used in the molding process to form the chambers may be supported at each end.

BRIEF DESCRIPTION OF THE DRAWINGS

FIG. 1 is a plan view of an embodiment of the present invention showing the plurality of containers of the microscope slide.

FIG. 2 is an elevation view of the embodiment of the microscope slide shown in FIG. 1.

FIG. 3 is a sectional view of the slide shown in FIG. 1 taken at section line 3—3 of FIG. 1.

FIG. 4 is a perspective view of the slide as shown in FIG. 1.

FIG. 5 is an enlarged elevation view of a portion of the slide shown in FIG. 2.

BEST MODE OF CARRYING OUT THE INVENTION

Referring now to FIG. 1 and FIG. 4, a microscope slide is depicted. Microscope slide 10 consists of an elongated base portion 12 having integrally affixed thereto a plurality of upstanding transverse separators 14. As can be seen in FIG. 1 each transverse separator 14 extends substantially all the way across the elongated base portion 12 to form a plurality of grooves 16 between the respective transverse separators 14.

Microscope slide 10 also includes a cover portion 18 which interconnects the plurality of transverse separators 14. Cover portion 18, as can be seen in FIGS. 1 and 4 forms with the transverse separators and the base portion 12 a plurality of fluid chambers. Each chamber can be characterized as that portion of groove 16 that is covered by cover portion 18. Cover portion 18 is separated from the base portion 12 by an amount optimally figured to result in fluid, that is placed in groove 16 adjacent cover portion 18, being drawn into chamber 20 by capillary action. It has been found that a separation in the neighborhood of 0.010 of an inch (0.254 mm) is sufficient to result in this capillary action. As can be seen in the drawings, each chamber 20 is open on each end. This permits fluid to be drawn well into the chamber and further excess fluid may be removed from either side. As will be seen, this construction results in a better quality slide.

As can be seen in FIGS. 1 and 4 the cover portion 18 is displaced toward one edge so that if an axis A is defined down the center of the elongated microscope slide, the cover portion 18 is substantially on one side of axis A. This provides a relatively longer open portion of groove 16 to the right of axis A as shown in FIG. 4 than the open portion of groove 16 to the left of cover portion 18.

Referring now to FIG. 5 it can be seen that an additional groove 24 may also be formed adjacent one of the transverse separators 14 in each of the plurality of grooves 16 to assist in filling chamber 20 with fluid. This groove 24 serves an additional purpose of draining off any excess fluid that may be retained in the adjacent chamber 20.

Referring now to FIG. 3 it can be seen that base portion 12 may be narrowed under the cover portion 18 to form an elongated cavity 26 in the base. The upper and lower surfaces of base portion 12 at cavity 26 and the upper and lower surfaces of cover portion 18 in the vicinity of each chamber 20 should be substantially parallel. Further the base portion 12 should be made of a material sufficiently translucent to permit a light to be transmitted therethrough to facilitate the viewing of any sample contained in chamber 20. It should be understood by those skilled in the art that cover portion 18 should also be substantially transparent with surfaces approaching optical quality to provide an adequate viewing slide to perform the necessary tests for the fluids contained in the container 20.

While various materials may be used to form this slide, a "wettable" plastic material is appropriate. A suitable material is cellulose propionate. Manufacture of the slide can be accomplished by conventional injection molding processes and is facilitated in part by having chamber 20 extend through to both edges of the slide since the tongue-shaped core to form the chamber 20 may be fixed at both ends. This can ensure a better control over the clearance between the top portion and the base portion and reduce refraction by insuring the upper and lower surfaces of cover portion 18 are parallel thereby producing a better slide.

APPLICABILITY

This invention provides for the use of a multi-chambered microscope slide that may be used for analysis of various fluids. It is particularly applicable for use in microscopic urinanalysis examination.

Slide 20 is filled a chamber at a time with the fluid to be examined by placing a small droplet of fluid in each groove 16 immediately adjacent the cover portion 18. This may be accomplished by the tip 28 of a pipette 30 being placed in groove 24 as shown in FIG. 5. Separator 14, being adjacent to groove 24, acts as a guide for tip 28 as it is moved into the vicinity of chamber 20. Since the cover portion 18 is formed sufficiently close to the base portion 12 to result in capillary action, the fluid to be examined is drawn into each chamber 20. The slide may then be positioned under a microscope for appropriate examination.

It should be understood that each chamber 20 may be used for a different sample thus, indicia means such as the letters A, B . . . I as shown in FIG. 4 may be permanently embossed on the material that the slide is made of. This permits the technician to identify by the indicia the particular sample being examined. Once the chambers 20 are filled the excess fluid may be removed from the slide by tilting the slide to one side or the other so that the fluid will run off through the grooves 16. Capillary action will retain the fluid in each chamber 20 so that the slide may be placed on the microscope without more loss of fluid.

The transverse separator 14 not only serves to form the chambers 20 along with the base and the cover portion but also serve an additional purpose of ensuring that there is no intermingling of the samples contained in the chambers as they are filled by the method described above.

Other aspects, objects, and advantages of this invention can be obtained from a study of the drawings, the disclosure and the appended claims.

I claim:

1. A microscope slide having a plurality of grooves forming a plurality of specimen chambers, the slide comprising an elongated base portion, a plurality of upstanding transverse separators integrally formed with said elongated base portion, and a cover portion, said cover portion integrally formed with and interconnecting said upstanding transverse separators to form therewith and with the base portion the plurality of specimen chamber said formed specimen chamber defining an additional groove in the elongated base portion thereof, said additional groove adjacent to one of the upstanding transverse separators.

2. The microscope slide of claim 1 wherein said elongated base portion defines an axis along its mid-line and further wherein said cover portion is positioned substantially on one side of said mid-line.

3. The microscope slide of claim 2 wherein said cover is separated from said elongated base portion a distance sufficient to result in capillary action drawing fluids into said specimen chamber when fluids are placed adjacent said specimen chamber.

4. The microscope slide of claim 2 wherein the elongated base portion defines an elongated cavity along its underside, said cavity generally below said cover portion.

5. The microscope slide of claim 4 wherein the upper and lower surfaces of said cover portion and the upper and lower surfaces of said elongated base portion are substantially parallel.

6. The microscope slide of claim 1 wherein each formed specimen chamber has associated therewith an indicia means.

7. The microscope slide of claim 1 wherein each formed specimen chamber is open to each side of the elongated base portion.

8. The microscope slide of claim 7 wherein said elongated base portion defines an axis along its mid-line and further wherein said cover portion is positioned substantially on one side of said mid-line.

9. The microscope slide of claim 8 wherein said cover portion is separated from said elongated base portion a distance sufficient to result in capillary action drawing fluids into said specimen chamber when fluids are placed adjacent said specimen chamber.

10. The microscope slide of claim 9 wherein the formed specimen chamber defines a groove in the elongated base portion thereof.

* * * * *

UNITED STATES PATENT AND TRADEMARK OFFICE
CERTIFICATE OF CORRECTION

PATENT NO. : 4,505,557

DATED : March 19, 1985

INVENTOR(S) : TIPTON L. GOLIAS

It is certified that error appears in the above-identified patent and that said Letters Patent is hereby corrected as shown below:

Col. 1, para 3, lines 33-34 delete "accomplished easily there is a probability that an underfill" and add -- accomplishing a complete fill of the cavity. Because of the--.

Col. 1, para 8, lines 67-68 delete ". The cover portion, also integrally formed with the base portion".

Col. 4, (claim 1) para 3, line 17 change "chamber" to --chambers,--.

Signed and Sealed this

First Day of October 1985

[SEAL]

Attest:

Attesting Officer

DONALD J. QUIGG

Commissioner of Patents and Trademarks—Designate